Jan. 16, 1934.　　　　G. GODDU　　　　1,943,430
ROUGHING MACHINE FOR SHOE PARTS
Filed Feb. 23, 1933　　　2 Sheets-Sheet 1

INVENTOR.

Jan. 16, 1934.  G. GODDU  1,943,430
ROUGHING MACHINE FOR SHOE PARTS
Filed Feb. 23, 1933  2 Sheets-Sheet 2
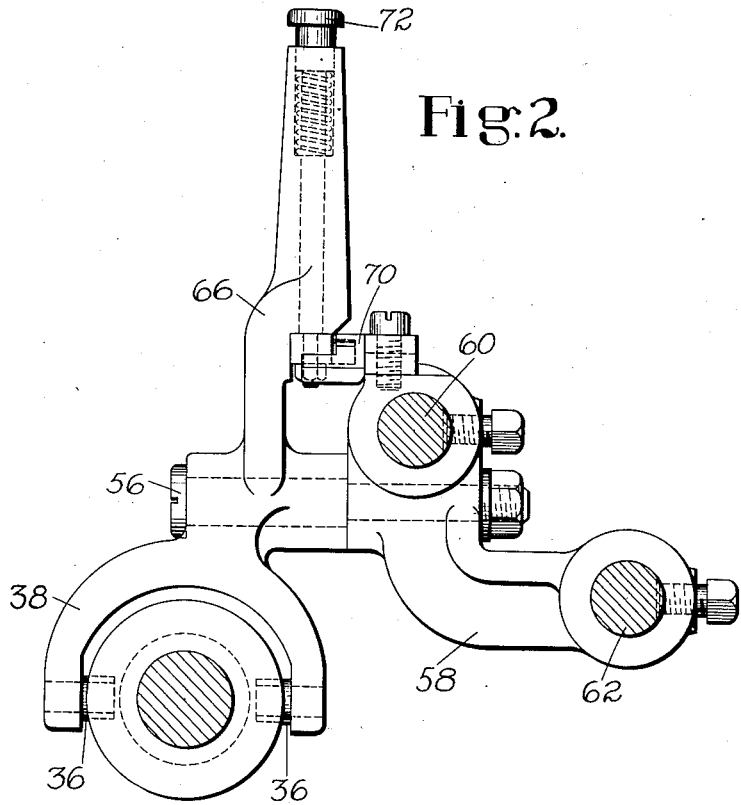
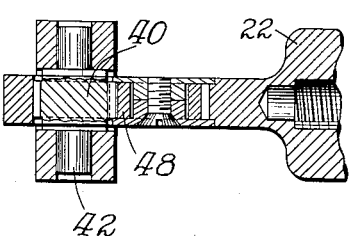
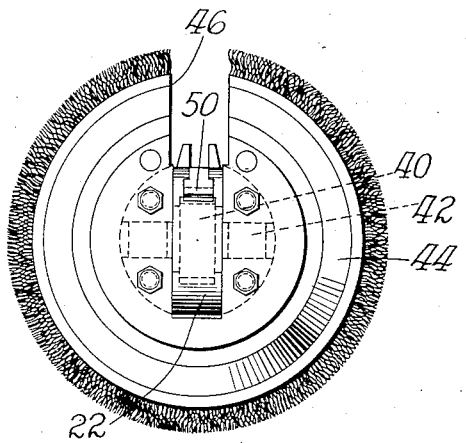

Patented Jan. 16, 1934

1,943,430

UNITED STATES PATENT OFFICE 1,943,430

ROUGHING MACHINE FOR SHOE PARTS

George Goddu, deceased, late of Winchester, Mass., by Isabelle W. Goddu, executrix, Winchester, Mass., assignor to United Shoe Machinery Corporation, Boston, Mass., a corporation of New Jersey Application February 23, 1933. Serial No. 657,983

7 Claims. (Cl. 69—1)

This invention relates to roughing machines for shoe parts and, more particularly, to machines employing rotating roughing tools having teeth or bristles which become worn or bent by use so that in order to secure continuous efficient operation the tool should be reversed frequently or, in other words, operated alternately in opposite directions for relatively short periods of time.

The invention is herein illustrated as embodied in a roughing machine employing a circular wire brush. The practice heretofore in using such a machine has been to operate until the wire bristles became bent backward and/or dulled at their advance, cutting edges sufficiently to slow down the roughing operation seriously, or to make it difficult to produce good work, and then to stop the machine, remove the tool from its driving shaft, turn it over manually, and remount it upon the shaft in reversed position, whereupon another period of efficient operation could be had.

Although the periods of efficient operation are short, the annoyance and waste of time caused by stopping the machine frequently, dismounting, reversing and remounting the tool are so great that operators are prone to continue the use of the machine with the tool running in the same direction too long, with consequent diminished efficiency and poorer quality of workmanship.

It is the object of the present invention to remedy this condition by providing an improved machine which may be operated continuously in a state of substantially maximum efficiency.

With this object in view, an important feature of the invention consists in the provision, in a roughing machine, of means for reversing the roughing tool relatively to the shaft upon which it is mounted, thus completely eliminating the necessity of taking the tool off its shaft and remounting it thereon each time the tool is reversed.

Preferably the tool reversing means is manually controlled and operable while the shaft is rotating, the reversal of the tool being effected practically instantaneously, so that there is no longer any temptation for the operator to run the tool in one direction longer than is desirable.

In the illustrated machine the tool is pivotally mounted upon a shaft, upon an axis at right angles to the axis of the shaft, the tool being provided with a radial notch through which the shaft can pass, to permit the tool to be reversed about its pivotal axis, and a sliding actuator upon the shaft being connected to the tool to provide for its easy reversal.

The foregoing and other features and advantages of the invention will be better understood and appreciated from reading the following detailed description of one embodiment thereof in connection with the accompanying drawings, in which Fig. 1 is a view in front elevation, with portions broken away, of the essential parts of the machine;

Fig. 2 is a view of the manually controlled mechanism for operating the roughing tool reversing actuator;

Fig. 3 is a view in elevation of the roughing tool, which is here shown as a circular wire brush, and Fig. 4 is a horizontal sectional view, taken upon the line IV—IV of Fig. 1, showing a detail of the brush mounting and reversing mechanism.

Figure 1:
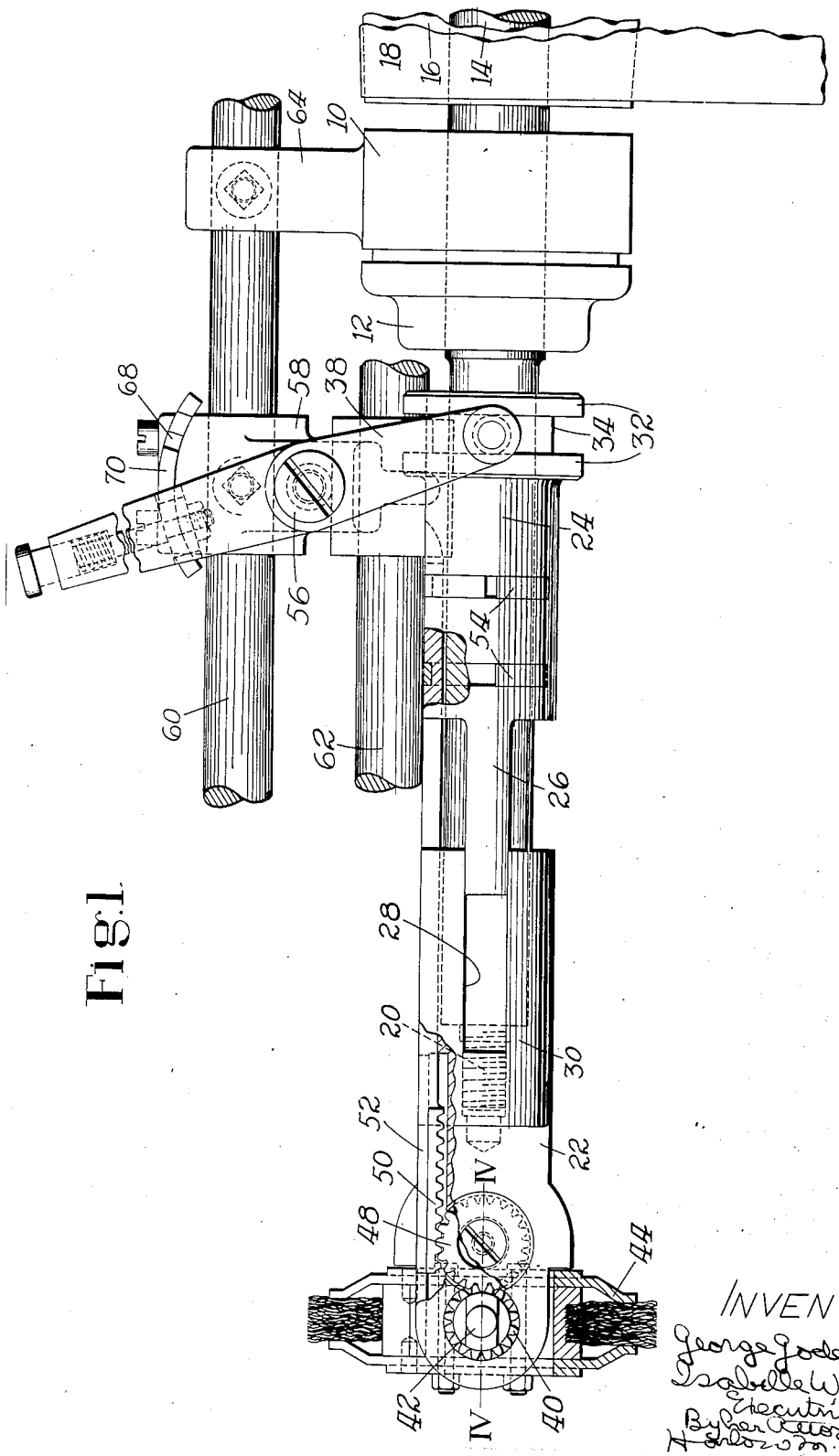

Referring now to the drawings, 10 indicates a fixed portion of any suitable machine frame for supporting the roughing mechanism. Secured in the frame 10 is a stationary bearing 12 in which is journaled a shaft 14. Fixed upon the shaft 14 is a pulley 16 which may be continuously driven by a belt 18 deriving power from any convenient source.

The shaft 14 is reduced and threaded at its left-hand end 20, as viewed in Fig. 1, for the reception of a bored-out and internally threaded tool carrying head 22 which, when screwed upon the threaded end 20 of the shaft 14, is rigid and coaxial with the said shaft.

A sleeve 24 is mounted to slide longitudinally of the shaft 14 but is prevented from rotation relative thereto by projecting tongues 26, engaging in slots 28 formed in a sleeve 30 which is integral with the tool carrying head 22. Collars 32 integral with the sleeve 24 define an annular groove 34 in which engage studs 36 carried by a manually operable shifting fork 38 further details of which will be described hereinafter.

There is formed through the outer end portion of the tool carrying head 22 a circular opening which provides a bearing for a pinion 40 having oppositely extending aligned pivots 42 whose axis intersects the axis of the shaft 14 at right angles thereto. Secured to the pivots 42 and, through them, to the pinion 40 is a roughing tool 44, illustrated herein as a circular wire brush having a radial notch 46 of sufficient width to permit the passage therethrough of the tool carrying member 22 constituting the end portion of the shaft 14. It will be understood that the provision of the notch 46 makes it possible, by rotation of the pinion 40 about the axis of the pivots 42 to reverse the position of the roughing tool relative to the shaft 14.

In order that the reversal of the roughing tool may be accomplished without stopping rotation of the shaft 14, an idle gear 48 mounted in the tool carrying head 22 is arranged in mesh with the pinion 40 and with a rack 50 which is secured to or formed upon an actuator bar 52 which is slidable longitudinally of the shaft 14 in a groove formed in the sleeve 30. The actuator bar is secured to the sleeve 24 by resilient rings 54 so that sliding movement of the sleeve 24 longitudinally of the shaft 14 imparts sliding longitudinal movement to the actuator bar and the rack 50. It will be apparent from Fig. 1 that longitudinal shifting of the sleeve 24 will, through the rack 50, the gear 48 and the pinion 40, turn the roughing tool 44 about the axis of the pivots 42 and reverse it relatively to the shaft 14. It will also be apparent that this reversal of the roughing tool may be easily and almost instantaneously effected while the shaft 14 is running by merely swinging the shifting fork 38.

The shifting fork 38 is pivotally mounted at 56 upon a support 58 carried by stationary bars 60, 62 supported by the machine frame, the supporting member for the bar 60 being shown in Fig. 1 as a bracket 64. Extending upward from the pivot 56 of the shifting fork 38 is a manually operable lever or handle 66 carrying a latch, cooperating with notches 68 in a stationary sector 70 to lock the shifting fork 38 in either of its two extreme positions, a spring-pressed button 72 being manually operable to release the latch and permit the fork to be shifted from one position to the other.

From the foregoing it will be apparent that the necessity of taking the roughing tool off its shaft and replacing it thereon each time the tool is to be reversed is completely eliminated and that the reversal of the tool may be effected so easily and expeditiously, without even stopping the machine, that the operator will willingly reverse the tool as frequently as is necessary for the most efficient operation, with the result that a high rate of production of work of good quality can be secured.

Having described the invention what is claimed as new and desired to be secured by Letters Patent of the United States is:

1. A roughing machine for shoe parts, comprising a bearing, a rotatable shaft journaled in said bearing, a roughing tool mounted upon the shaft, and means for reversing the tool relatively to the shaft.

2. A roughing machine for shoe parts, comprising a bearing, a rotatable shaft journaled in said bearing, a roughing tool mounted upon the shaft, and manually controlled means for reversing the tool relatively to the shaft, at the will of the operator, while the shaft is rotating.

3. A roughing machine for shoe parts, comprising a rotatable shaft, a roughing tool pivotally mounted upon the shaft and reversible relatively to the shaft about an axis at right angles to the axis of the shaft.

4. A roughing machine for shoe parts, comprising a rotatable shaft, a roughing tool pivotally mounted upon the shaft for reversal about an axis at right angles to the axis of the shaft, and means for reversing the tool while the shaft is rotating.

5. A roughing machine for shoe parts, comprising a rotatable shaft, and a circular roughing tool pivoted to the shaft upon an axis at right angles to the axis of the shaft, said tool having a radial notch through which the shaft can pass, to permit the tool to be reversed about its pivotal axis.

6. A roughing machine for shoe parts comprising a rotatable shaft, a circular roughing tool pivoted to the shaft upon an axis at right angles to the axis of the shaft, an actuator carried by the shaft and mounted to slide longitudinally thereof, and connections between the actuator and the tool for causing reversal of the tool about its pivotal axis when the actuator is moved longitudinally of the shaft.

7. A roughing machine for shoe parts comprising a rotatable shaft, a circular roughing tool pivoted to the shaft upon an axis at right angles to the axis of the shaft, an actuator rack mounted to slide longitudinally on the shaft, a pinion secured to the tool concentric with the pivotal axis thereof, and a gear meshing with said rack and said pinion.

ISABELLE W. GODDU,
*Executrix of the Will of George Goddu, Deceased.*